(12) United States Patent
Nonokawa et al.

(10) Patent No.: US 7,709,088 B2
(45) Date of Patent: May 4, 2010

(54) INORGANIC FIBERS, FIBER STRUCTURE AND PROCESS FOR THEIR PRODUCTION

(75) Inventors: Ryuji Nonokawa, Yamaguchi (JP); Takanori Miyoshi, Yamaguchi (JP); Shinya Komura, Yamaguchi (JP); Hiroyoshi Minematsu, Tokyo (JP)

(73) Assignee: Teijin Limited, Osaka (JP)

( * ) Notice: Subject to any disclaimer, the term of this patent is extended or adjusted under 35 U.S.C. 154(b) by 516 days.

(21) Appl. No.: 11/630,315

(22) PCT Filed: Jun. 21, 2005

(86) PCT No.: PCT/JP2005/011693

§ 371 (c)(1),
(2), (4) Date: Dec. 21, 2006

(87) PCT Pub. No.: WO2006/001403

PCT Pub. Date: Jan. 5, 2006

(65) Prior Publication Data

US 2008/0070037 A1    Mar. 20, 2008

(30) Foreign Application Priority Data

Jun. 23, 2004   (JP) ............................. 2004-184797

(51) Int. Cl.
| | | |
|---|---|---|
| C04B 35/52 | (2006.01) | |
| C04B 35/56 | (2006.01) | |
| C04B 35/00 | (2006.01) | |
| D02G 3/00 | (2006.01) | |
| B32B 9/00 | (2006.01) | |
| C03B 37/016 | (2006.01) | |
| C03B 37/02 | (2006.01) | |
| C03B 37/04 | (2006.01) | |

(52) U.S. Cl. ......................... 428/367; 501/87; 501/88; 501/95.1; 428/364; 65/395; 65/401; 65/469; 264/639; 264/640

(58) Field of Classification Search ................ 428/364, 428/367, 368, 370, 375, 376, 378, 379, 380, 428/384, 389; 264/364, 639, 640; 501/35, 501/38, 88, 95.1; 65/395, 401, 469
See application file for complete search history.

(56) References Cited

U.S. PATENT DOCUMENTS 4,618,529 A * 10/1986 Yamamura et al. .......... 442/205

(Continued)

FOREIGN PATENT DOCUMENTS

EP     826647 A    8/1997

(Continued)

OTHER PUBLICATIONS

Patel et al., "Novel Preparation method of silicon carbide nanofibers by use of polymer blend and melt spinning techniques," Journal of the ceramic society of Japan, International Edition, Fuji Marketing Research Company, Tokyo, JP vol. 112, No. 5, 2004, pp. S901-S903.

(Continued)

*Primary Examiner*—Karl E Group
*Assistant Examiner*—Noah S Wiese
(74) *Attorney, Agent, or Firm*—Sughrue Mion, PLLC (57) ABSTRACT

Inorganic fibers consisting substantially of silicon, carbon, oxygen and a transition metal, having a fiber size of no greater than 2 μm and having fiber lengths of 100 μm or greater.

16 Claims, 11 Drawing Sheets

U.S. PATENT DOCUMENTS 4,770,935 A * 9/1988 Yamamura et al. .......... 428/366
4,961,990 A * 10/1990 Yamada et al. .............. 442/187
5,116,668 A * 5/1992 Yamamoto et al. .......... 428/221

FOREIGN PATENT DOCUMENTS

| EP | 0 826 647 A1 | 3/1998 |
|---|---|---|
| EP | 1 264 804 A1 | 12/2002 |
| EP | 1264804 A | 12/2002 |
| JP | 7-189039 A | 7/1995 |
| JP | 2003-73964 A | 3/2003 |
| JP | 2004-60095 A | 2/2004 |
| JP | 2004-60096 A | 2/2004 |
| WO | 96/30570 A1 | 10/1996 |
| WO | WO 2004/091785 A1 | 10/2004 |

OTHER PUBLICATIONS

Ishikawa, "High Strength Titanium Oxide Fibers", Kogyo Zairyo, Nikkan Kogyo Shimbun, Jul. 2002, vol. 50, pp. 48-51.

* cited by examiner

INORGANIC FIBERS, FIBER STRUCTURE AND PROCESS FOR THEIR PRODUCTION

TECHNICAL FIELD

The present invention relates to inorganic fibers, and more specifically it relates to inorganic fibers with small fiber diameters, a fiber structure and a process for their production.

BACKGROUND ART

In recent years, silicon-containing polymers have become notable as functional materials such as heat-resistant materials, optical functional materials, ceramic materials and the like.

Inorganic fibers made of silicon-containing polymers developed to date have excellent heat resistance and dynamic properties compared to other materials, and are therefore employed for use under harsh conditions, for example, as aircraft materials and anti-pollution materials. As such inorganic fibers there have been proposed, for example, silicon carbide fibers (NIKALON™ by Nippon Carbon Co., Ltd.), silicon-titanium-carbon-oxygen fibers (Tirano Fibers™ by Ube Industries, Ltd.) and the like (see Patent document 1 and Non-patent document 1).

In particular, silicon-titanium-carbon-oxygen fibers are photocatalytically active and are used for decomposition of dioxins or for sterilization (see Non-patent document 1). However, because the fiber diameters of such fibers are limited to 5-8 µm, the surface area of fibers exhibiting photocatalytic activity has been insufficient. Moreover, fibers with a larger surface area are also preferred when these inorganic fibers are used as filters, and therefore thinner fibers have been desired.

Recently, nonwoven fabrics composed of inorganic fibers with photocatalytic properties have been proposed (see Patent documents 2 and 3).

However, the mean fiber diameter of fibers obtained by such production processes is about 5 µm, and production of inorganic fibers of 2 µm or smaller is very difficult by melt-blow production techniques. Also, since the obtained fibers are limited to smooth fibers it has not been possible to increase the area-to-weight ratio.

On the other hand, as a method of producing thin inorganic fibers there has been proposed a method in which an electric field is applied to a sol solution for spinning, and the filament is then sintered (Patent document 4). The fiber diameters obtained by this process are thinner than 2 µm, but it is very difficult to impart photocatalytic activity to the fibers by this production process. Moreover, the obtained fibers are essentially glass and have insufficient heat resistance.

[Patent document 1] JP-A H7-189039
[Patent document 2] JP-A 2004-60095
[Patent document 3] JP-A 2004-60096
[Patent document 4] JP-A 2003-73964
[Non-patent document 1] Ishikawa, H., "High-Strength Titanium Oxide Fibers", Kogyo Zairyo, Nikkan Kogyo Shimbun, July 2002, Vol. 50, pp. 48-51.

DISCLOSURE OF THE INVENTION

It is an object of the present invention to solve the problems inherent in the aforementioned prior art by providing fibers made of silicon, carbon, oxygen and transition metals, having an extremely small fiber diameter.

It is another object of the invention to provide a fiber structure containing the fibers.

It is yet another object of the invention to provide a process for production of the fiber structure by a very convenient method.

BEST MODE FOR CARRYING OUT THE INVENTION

The present invention will now be described in detail.

The inorganic fibers made of silicon, carbon, oxygen and transition metals must have a fiber diameter of no greater than 2 µm, and fiber lengths of at least 100 µm.

If the fiber diameter is greater than 2 µm, the stiffness of the fibers increases and they become brittle, and therefore when they are used for a filter or the like, for example, their handleability is poor because the fibers break and can cause secondary contamination. Furthermore, because the area-to-weight ratio is too small, if titanium having photocatalytic properties is used as a transition metal as described hereunder, an undesirable disadvantage results as the effective usable portion is reduced based on the residual titanium. The fiber diameter is preferably 0.01-1.5 µm and more preferably 0.05-1 µm. When the fiber surfaces lack depressions as described hereunder, the fiber diameter is preferably no greater than 1 µm.

If the fiber length is less than 100 µm, the dynamic strength of the obtained fiber structure will be insufficient. The fiber length is preferably at least 150 µm and more preferably at least 1 mm.

Titanium or zirconium is preferred as a transition metal in the inorganic fibers of the invention in order to confer a photocatalytic property or to exhibit adequate dynamic properties and corrosion resistance. The molar ratio of the silicon and transition metal is not particularly restricted so long as it allows the required properties to be exhibited, but a ratio in the range of 100/1-1/10 is preferred for satisfactory dynamic properties of the obtained fibers.

According to the invention, "inorganic fibers" refers to fibers containing no more than 5 wt % of organic compounds.

The fibers of the invention preferably have depressions on the surface with diameters of 0.01-0.5 μm. If the diameters of the depressions are less than 0.01 μm the surface area is undesirably reduced, and if they exceed 0.5 μm, the dynamic properties of the fibers are undesirably reduced. The diameters are preferably 0.02-0.5 μm.

In the surface structure of the fibers of the invention, depressions preferably occupy 10-95% of fiber surface. If the depressions occupy less than 10% of the surface the surface area of the fibers will be undesirably small, and if they occupy more than 95%, the dynamic properties of the fibers will be undesirably reduced. The depressions more preferably occupy 20-80% of the surface.

The fiber structure of the invention contains at least fibers comprising silicon, carbon, oxygen and a transition metal, the term "fiber structure", as used according to the invention, referring to a three-dimensional structure formed by subjecting the fibers to a procedure such as weaving, knitting, lamination or the like, where a preferred example is a nonwoven fabric.

Fibers composed of silicon, carbon, oxygen and a transition metal according to the invention preferably constitute 100% of the fiber structure.

A fiber structure of the invention may be produced using any process that can yield the aforementioned fiber structure, but there may be mentioned as a preferred mode, a production process including a step of dissolving the organic silicon-based macromolecule, a fiber-forming organic macromolecule and a transition metal compound to produce a solution, a step of spinning the solution by an electrospinning and a step of obtaining a fiber structure accumulated on a collecting electrode plate by the spinning to produce a precursor ultrafine fiber structure, and including a step of rendering the ultrafine fiber structure infusible to obtain an infusible ultrafine fiber structure, followed by a step of calcinating the infusible ultrafine fiber structure to obtain a ceramic ultrafine fiber structure.

The organic silicon-based macromolecule of the invention is not particularly restricted, and as examples there may be mentioned polycarbomethylsilane, polytitanocarbosilane, polyzirconocarbosilane, polyborodiphenylsiloxane, polydimethylsilane and the like.

Among these, organic silicon-based macromolecules containing a repeating unit represented by the following general formula (1) are preferred from the standpoint of spinning stability, and polycarbomethylsilane is particularly preferred. Most preferred is polycarbomethylsilane with a molecular weight of 500 or greater.

(1)

(wherein R and R' are each independently selected from the group consisting of hydrogen, C1-10 lower alkyl groups and phenyl.)

The organic macromolecule of the invention is not particularly restricted so long as it is soluble in the solvent and can exhibit viscosity allowing spinning by elctrospinning, and as examples there may be mentioned polyethyleneglycol (polyethylene oxide), polypropylene oxide, polyethyleneglycol (polyethylene oxide)-polypropylene oxide block copolymer, polycyclopentene oxide, polyvinyl chloride, polyacrylonitrile, polylactic acid, polyglycolic acid, polylactic acid-polyglycolic acid copolymer, polycaprolactone, polybutylene succinate, polyethylene succinate, polystyrene, polycarbonate, polyhexamethylenecarbonate, polyarylate, polyvinylisocyanate, polybutylisocyanate, polymethyl methacrylate, polyethyl methacrylate, poly-n-propyl methacrylate, poly-n-butyl methacrylate, polymethyl acrylate, polyethyl acrylate, polybutyl acrylate, polyethylene terephthalate, polytrimethylene terephthalate, polyethylene naphthalate, poly-p-phenylene terephthalamide, poly-p-phenylene terephthalamide-3,4'-oxydiphenylene terephthalamide copolymer, polymetaphenylene isophthalamide, cellulose diacetate, cellulose triacetate, methylcellulose, propylcellulose, benzylcellulose, fibroin, natural rubber, polyvinyl acetate, polyvinyl methyl ether, polyvinyl ethyl ether, polyvinyl n-propyl ether, polyvinyl isopropyl ether, polyvinyl n-butyl ether, polyvinyl isobutyl ether, polyvinyl tert-butyl ether, polyvinylidene chloride, poly(N-vinylpyrrolidone), poly(N-vinylcarbazole), poly(4-vinylpyridine), polyvinyl methyl ketone, polymethyl isopropenyl ketone, polystyrenesulfone, nylon 6, nylon 66, nylon 11, nylon 12, nylon 610, nylon 612, and their copolymers or polymer blends thereof.

Preferred among these are polyethyleneglycol (polyethylene oxide), polypropylene oxide and polyethyleneglycol (polyethylene oxide)-polypropylene oxide block copolymer, with polyethylene glycol being more preferred.

Polyethylene glycol with a molecular weight of 50,000 or greater is especially preferred, and polyethylene glycol with a molecular weight of 100,000 to 8 million is most preferred.

There are no particular restrictions on transition metals for the invention, but titanium or zirconium are preferred because they can confer a photocatalytic property or produce adequate dynamic properties and corrosion resistance. Having a transition metal present in the solution allows efficient production of fibers with fiber diameters of 2 μm and smaller in electrostatic spinning, although the function thereof has not been fully elucidated.

An electrospinning is a method in which a solution of a fiber-forming compound is discharged into an electrostatic field formed between two electrodes, the solution is drawn toward the electrodes, and the resulting filamentous substance is accumulated on a collecting plate to obtain a fiber structure, where the filamentous substance need not be free of the solvent used to dissolve the fiber-forming compound but may also include the solvent.

An apparatus used for the electrospinning will now be described.

The aforementioned electrodes may be of any type such as metal, inorganic or organic substances so long as they exhibit electrical conductivity, and they may also have electrical conductive thin-films of metal, inorganic or organic substances on insulators.

The electrostatic field may be formed by a pair of or more electrodes, and a high voltage may be applied to any of the electrodes. This also includes cases of using, for example, a total of three electrodes where two are high-voltage electrodes with different voltage values (for example, 15 kV and 10 kV) and one is a grounded electrode, as well as cases of using more than three electrodes.

A procedure for producing fibers for a fiber structure of the invention by electrospinning will now be explained in order.

First, the organic silicon-based macromolecule, fiber-forming organic macromolecule and transition metal compound are dissolved to form a solution, where the concentration of the fiber-forming organic macromolecule in the solution is preferably 0.05-20 wt %. A low concentration of less than 0.05 wt % is not preferred because it will be difficult to form a fiber structure. If it is greater than 20 wt %, the mean diameter of the obtained fibers may be increased, or the viscosity may be increased making it difficult to accomplish electrospinning. The preferred concentration range is 0.1-10 wt %.

The concentration of the organic silicon-based macromolecule in the solution is preferably 0.1-50 wt %. If the concentration is less than 0.1 wt %, the dynamic strength of the obtained fiber structure will be undesirably reduced. It is preferably not greater than 50 wt % because this will make it difficult to obtain a fiber structure. The range is more preferably 1-30 wt %.

The concentration of the transition metal compound in the solution is preferably 0.1-50 wt %. If the concentration is less than 0.1 wt %, the dynamic strength of the fiber structure will be undesirably reduced. It is preferably not greater than 50 wt % because this will make it difficult to obtain a fiber structure. The range is more preferably 1-30 wt %.

The solvent used to dissolve the organic silicon-based macromolecule and organic macromolecule is not particularly restricted so long as it can dissolve the fiber-forming organic macromolecule and can evaporate in the stage of spinning by electrospinning to form fibers, but it is preferably a nonpolar solvent from the standpoint of solubility of the organic silicon-based macromolecule. As examples of solvents there may be mentioned methylene chloride, chloroform, carbon tetrachloride, cyclohexane, benzene, toluene and trichloroethane. Preferred among these are halogen-based solvents, with methylene chloride being particularly preferred. These solvents may be used alone, or a plurality of solvents may be combined for use as a mixed solvent.

Since in the case of electrospinning, especially, the solution viscosity and solvent evaporation rate significantly affect the mean diameter of the formed fibers, a polar solvent such as acetone, ethanol, isopropanol, methanol, butanol, tetrahydrofuran, benzyl alcohol, 1,4-dioxane, propanol, cyclohexanone, phenol, pyridine, acetic acid, N,N-dimethylformamide, N,N-dimethylacetamide, acetonitrile, N-methylpyrrolidone, N-methylmorpholine-N-oxide, 1,3-dioxolane, methyl ethyl ketone or the like may be added with the aforementioned solvent as an adjustor.

The stage of spinning the aforementioned solution in electrospinning will now be explained. Any desired method may be employed for discharge of the solution into the electrostatic field, and for example, the solution may be supplied to a nozzle for appropriate positioning of the solution in the electrostatic field, and the solution drawn from the nozzle by the electrical field for formation into a filament. The solution temperature during this period is not particularly restricted, but it will normally be from 0° C. to the boiling point of the solvent, and spinning can be easily accomplished even at room temperature. The relative humidity is not particularly restricted, but it is preferably 10-70% for satisfactory stability during electrospinning, and it is more preferably 20-60%. The basis weight and film thickness of the obtained fiber structure may be controlled as desired by adjusting the discharge time and the voltage and the spinning distance.

Figure 1:
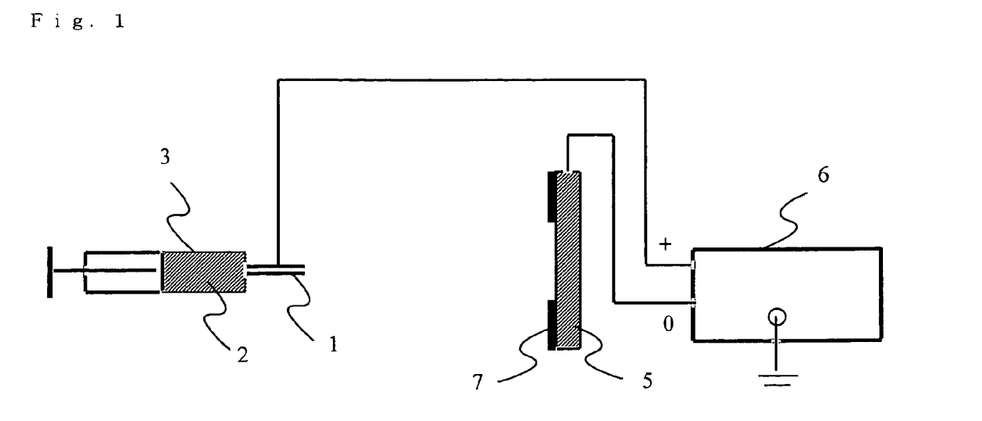
FIG. 1 is a schematic drawing of an embodiment of an apparatus construction for production of an ultrafine fiber structure according to the invention.

This will now be explained in further detail with reference to FIG. 1.

Figure 2:
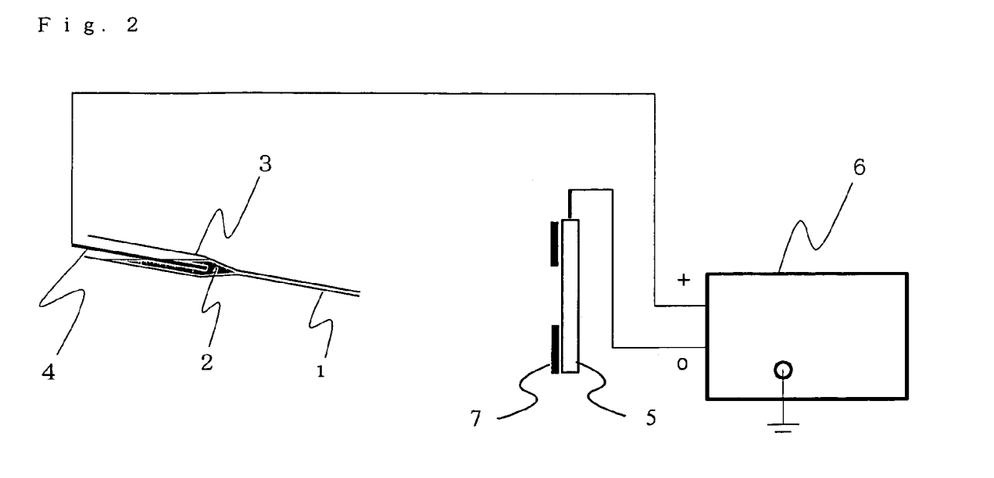
FIG. 2 is a schematic drawing of an embodiment of an apparatus construction for production of an ultrafine fiber structure according to the invention.

An injection needle-shaped solution ejection nozzle (1 in FIG. 1) having a voltage applied by appropriate means such as a high-voltage generator (6 in FIG. 1) is fitted at the tip of the cylindrical solution-holder of a syringe (3 in FIG. 1), and the solution (2 in FIG. 1) is guided to the solution, ejection nozzle tip. The tip of the solution ejection nozzle (1 in FIG. 1) may be situated at an appropriate distance from a grounded filamentous substance-collecting electrode (5 in FIG. 1), and the solution (2 in FIG. 1) ejected from the tip of the solution ejection nozzle (1 in FIG. 1) to form a filamentous substance between the nozzle tip and the filamentous substance-collecting electrode (5 in FIG. 1). Here, a mask (7 in FIG. 1) is preferably placed on the filamentous substance-collecting electrode (5 in FIG. 1) to allow more efficient production of the ultrafine fibers in the desired shapes. A mask made of an organic macromolecule with a permittivity of 2.4 or greater is effective as the mask. As a different mode, shown in FIG. 2, fine droplets of the solution (not shown) may be introduced into an electrostatic field, with the only condition being that the solution (2 in FIG. 2) is placed in the electrostatic field and held at a distance from the filamentous substance-collecting electrode (5 in FIG. 2) which allows formation into a filament. For example, an electrode (4 in FIG. 2) counter to the filamentous substance-collecting electrode may be inserted directly into the solution (2 in FIG. 2) in the solution holder (3 in FIG. 2) with the solution ejection nozzle (1 in FIG. 2).

The diameter of the spinning nozzle is not particularly restricted, but is preferably in the range of 50-1000 μm. Also, the nozzle is not limited to a single one, as two or more nozzles may be used. The nozzle material may be metallic or non-metallic.

A metallic nozzle may be used as the electrode, while a non-metallic nozzle may have an electrode mounted therein to allow application of a voltage. By increasing the number of nozzles, it is possible to raise the solution supply speed, thereby markedly improving productivity. Also, the distance between electrodes will depend on the charge, nozzle dimensions, ejection volume of the solution from the nozzle and the solution concentration, but a distance of 5-20 cm has been found to be suitable for approximately 10 kV. The applied electrostatic potential will normally be 3-100 kV, preferably 5-50 kV and more preferably 5-35 kV. The desired potential can be produced by any appropriate method known in the prior art.

The two modes described above employ an electrode also serving as the collecting plate, but a material serving as the collecting plate may also be placed between the electrodes, to provide a collecting plate separate from the electrodes for collection of a filament laminate. In this case, a belt-like substance, for example, is placed between the electrodes and used as the collecting plate to allow continuous production.

The stage of obtaining a fiber structure accumulated on the collecting plate will now be explained. According to the invention, a filamentous substance is formed by evaporation of the solvent, depending on the conditions, while the solution is drawn toward the collecting plate. Although the solvent will usually evaporate completely by the end of the period of collection on the collecting plate at room temperature, the drawing may be accomplished under reduced pressure conditions if the solvent evaporation is insufficient. A fiber structure satisfying at least the fiber mean diameter and fiber length is formed upon collection on the collecting plate. The temperature for drawing will depend on the evaporation behavior of the solvent and the viscosity of the spinning solution, but will normally be in the range of 0-50° C.

According to the invention, the organic silicon-based macromolecule and transition metal compound are spun by the method described above, and then rendered infusible. The method of rendering the spun fiber structure infusible may be a publicly known method, and for example, there may be employed a method of heating the fiber structure at a temperature in the range of 50-400° C. in an oxidizing gas atmosphere, or a method of irradiating the spun fiber structure with γ-rays or an electron beam.

Calcination of the infusible fiber structure is carried out in an oxygen atmosphere, in an inert gas atmosphere such as nitrogen or argon, or in a vacuum.

The maximum calcinating temperature is a temperature in the range of 800-2000° C., and preferably a temperature in the range of 1000-1600° C. A temperature of above 2000° C. will cause rapid crystallization of the silicon carbide and vaporization of the silicon carbide, resulting in drastically reduced strength of the obtained inorganic fibers.

The fiber structure obtained by the production process of the invention may be used alone, but it may also be used in combination with other members depending on handleability and other essential factors. For example, a wire mesh, nonwoven fabric, woven fabric or film that can serve as a support material may be used as the collecting plate and a filament laminate formed thereover to allow fabrication of a member comprising a combination of the support material and the filament laminate.

EXAMPLES

The present invention will now be explained in greater detail by examples, with the understanding that the invention is not limited in any way by these examples. The values in the examples were determined by the following methods.

(1) Fiber Mean Diameter:

The fiber diameter was measured by selecting 20 random locations from a photograph taken of the surface of the obtained fiber structure (8000× magnification) using a scanning electron microscope (S-2400 by Hitachi, Ltd.), and the average value of all the fiber diameters (n=20) was determined and recorded as the fiber mean diameter.

(2) Presence of Fibers with Fiber Lengths of Less than 100 μm:

A photograph taken of the surface of the obtained fiber structure (400× or 800× magnification) using a scanning electron microscope (S-2400 by Hitachi, Ltd.) was observed to confirm the presence of fibers with fiber lengths of less than 100 μm.

(3) Presence of Depressions in Fiber Surfaces:

A photograph taken of the surface of the obtained fiber structure (20,000× magnification) using a scanning electron microscope (S-2400 by Hitachi, Ltd.) was observed, the diameters of depressions (n=20) were measured from the photograph, and the average value was calculated.

Also, the proportion of the fiber surfaces occupied by depressions (n=5) was measured and the average value was calculated.

Example 1

A solution was prepared containing 8 parts by weight of polycarbomethylsilane (molecular weight: 3500; Aldrich Co.), 0.1 part by weight of polyethylene glycol (molecular weight: 4 million, Wako Pure Chemical Industries, Ltd.), 83.9 parts by weight of dichloromethane (special grade, Wako Pure Chemical Industries, Ltd.) and 8 parts by weight of titanium tetrabutoxide (Wako Pure Chemical Industries, Ltd.). Next, the apparatus shown in FIG. 1 was used to discharge the solution onto a collecting electrode (5 in FIG. 1) for 10 minutes. The inner diameter of the ejection nozzle (1 in FIG. 1) was 0.5 mm, the voltage was 12 kV, and the distance from the ejection nozzle 1 to the filamentous substance-collecting electrode 5 was 15 cm. The obtained fiber structure was in the form of a nonwoven fabric.

Figure 3:
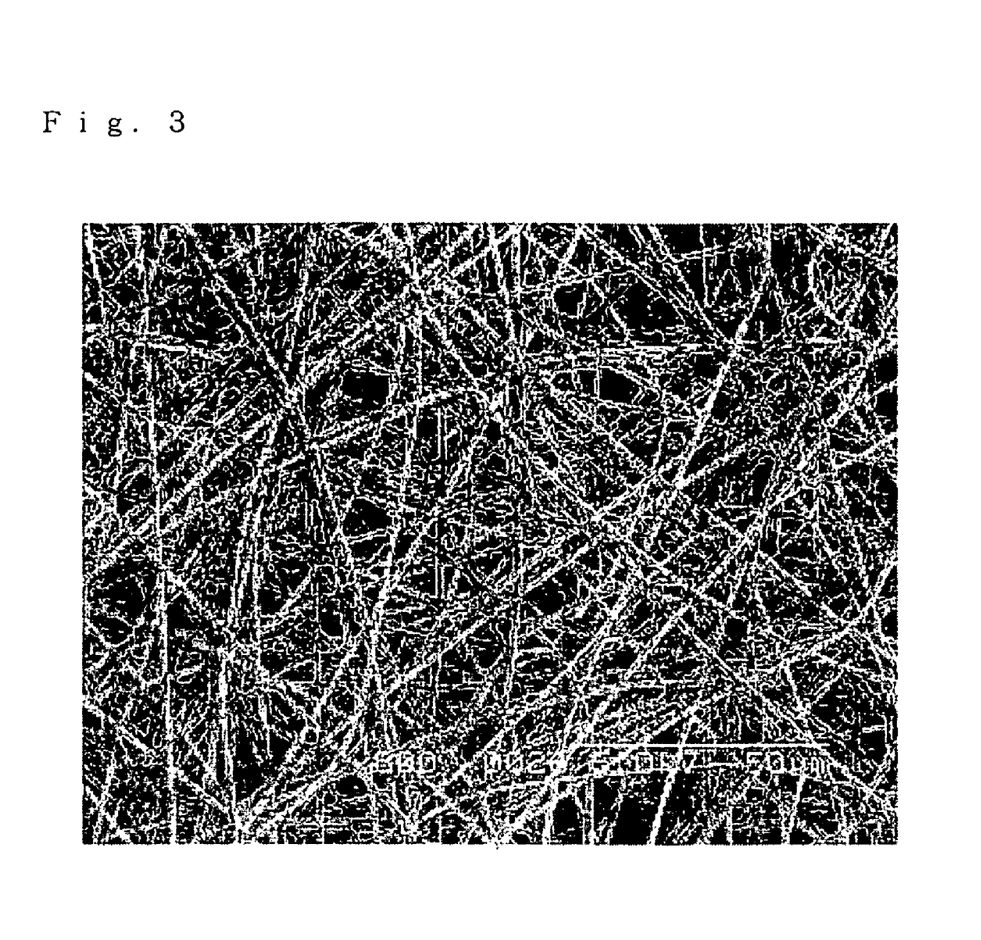
FIG. 3 is a photograph of the surface of the calcinated fiber structure obtained in Example 1, taken with a scanning electron microscope (800×).
Figure 4:
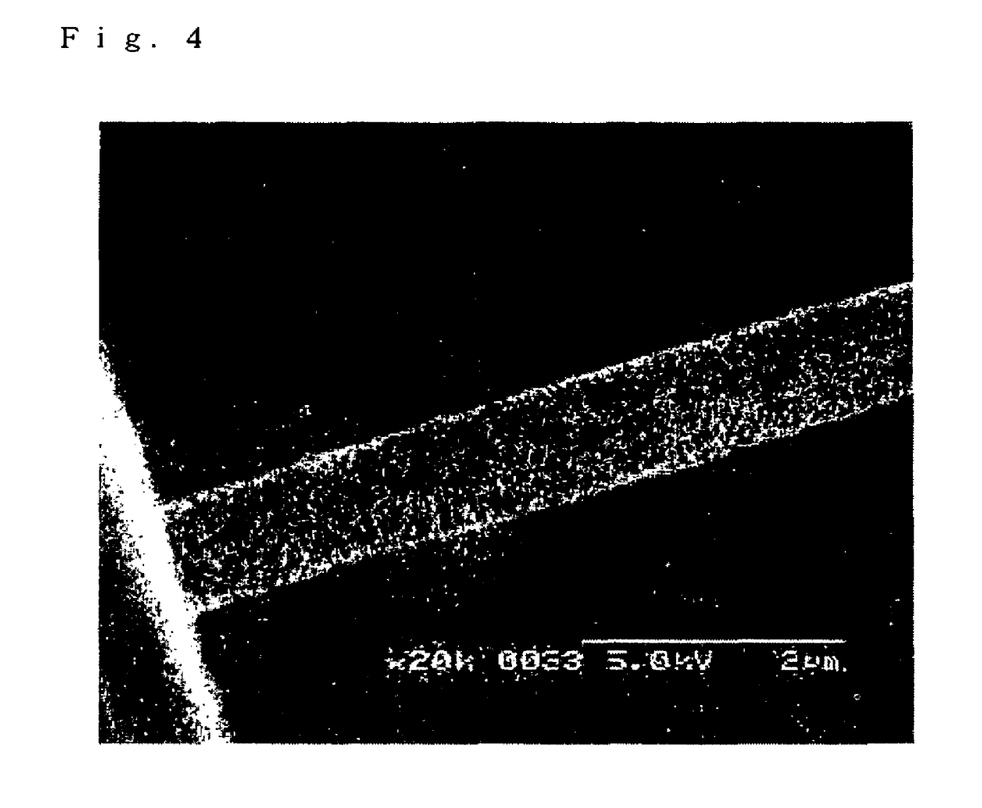
FIG. 4 is a photograph of the surface of the calcinated fiber structure obtained in Example 1, taken with a scanning electron microscope (20,000×).

The obtained fiber structure was allowed to stand in air at 70° C. for 100 hours, and after raising the temperature to 200° C. (temperature-elevating rate: 10° C./min) and holding for 1 hour, the temperature was raised to 1000° C. (temperature-elevating rate: 2° C./min), the temperature was maintained for 3 hours, and the structure was then cooled to room temperature. The obtained fiber structure was flexible and had a mean fiber diameter of 0.9 μm, the mean diameter of depressions in the fiber surfaces was 54 nm, and the area of the depressions occupied 53% of the fiber surfaces. When the obtained fiber structure was observed with a scanning electron microscope, no fibers with fiber lengths of less than 100 μm were observed. Scanning electron microscope photographs of the surface of the obtained fiber structure are shown in FIGS. 3 and 4.

The obtained fiber structure was cut out to a size of 2 cm length, 2 cm width, and the piece was immersed in 5 ml of a 10 ppm methylene blue aqueous solution. An Eye Super UV tester SUV-F11 by Iwasaki Electric Co., Ltd., was used for 30 minutes of irradiation of light in a range of 295-450 nm at an intensity of 60 mW/cm$^2$, and the solution was completely transparent. This demonstrated that the obtained fiber structure has photocatalytic activity.

Example 2

A fiber structure was formed as a nonwoven fabric by the same procedure as in Example 1, except that polyethylene oxide (molecular weight: 200,000, Aldrich Co.) was used instead of polyethylene glycol (molecular weight: 4 million, Wako Pure Chemical Industries, Ltd.) in the dope.

When the obtained fiber structure was rendered infusible and fired by the same procedure as in Example 1, the obtained fiber structure was flexible and had a mean fiber diameter of 1.0 μm, the mean diameter of depressions in the fiber surfaces was 70 nm, and the area of the depressions occupied 32% of the fiber surfaces.

Figure 5:
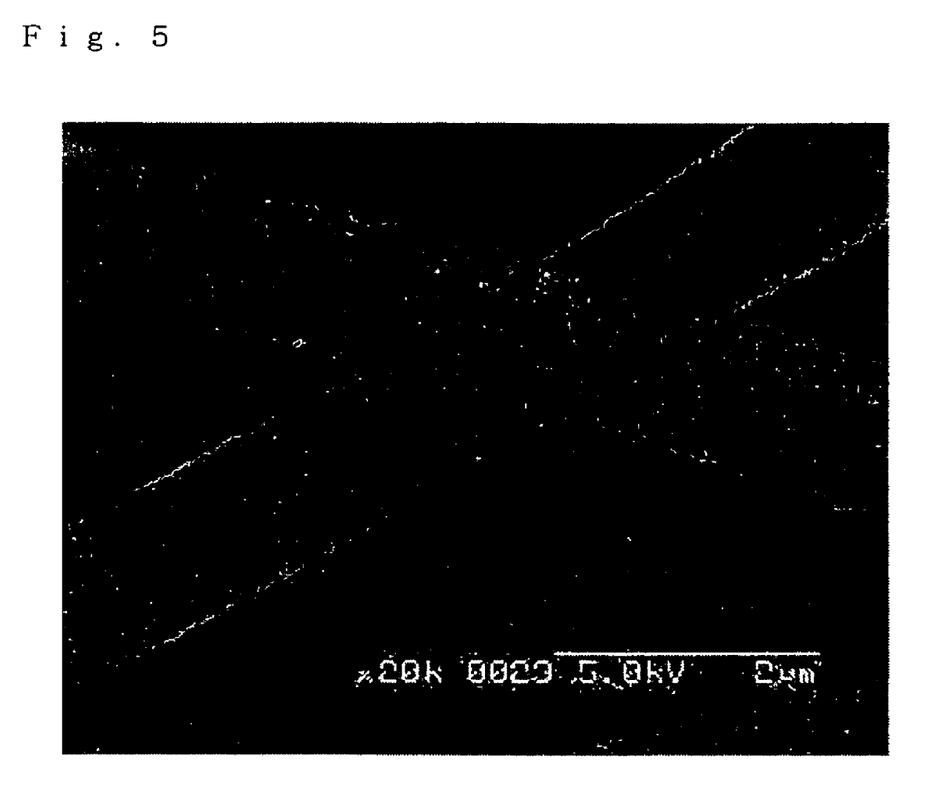
FIG. 5 is a photograph of the surface of the calcinated fiber structure obtained in Example 2, taken with a scanning electron microscope (20,000×).

The nonwoven fabric fiber structure was then shaped. When the obtained fiber structure was measured by scanning electron microscope (S-2400 by Hitachi, Ltd.), no fibers with fiber lengths of less than 100 μm were observed. A scanning electron microscope photograph of the surface of the obtained fiber structure is shown in FIG. 5.

Example 3

A fiber structure was formed as a nonwoven fabric by the same procedure as in Example 1, except that a solution comprising 8 parts by weight of polycarbomethylsilane (molecular weight: 3500, Aldrich), 8 parts by weight of zirconium tetrabutoxide (80% butanol solution, Wako Pure Chemical Industries, Ltd.), 0.1 part by weight of polyethylene glycol (molecular weight: 4 million, Wako Pure Chemical Industries, Ltd.) and 181.9 parts by weight of dichloromethane (special grade, Wako Pure Chemical Industries, Ltd.) was used as the dope. The obtained fiber structure was allowed to stand in air at 90° C. for 16 hours, and after raising the temperature to 200° C. (temperature-elevating rate: 10° C./min) and holding for 3 hours, the temperature was raised to 1000° C. at a temperature-elevating rate of 2° C./min in a nitrogen atmosphere, and then returned to room temperature.

Figure 6:
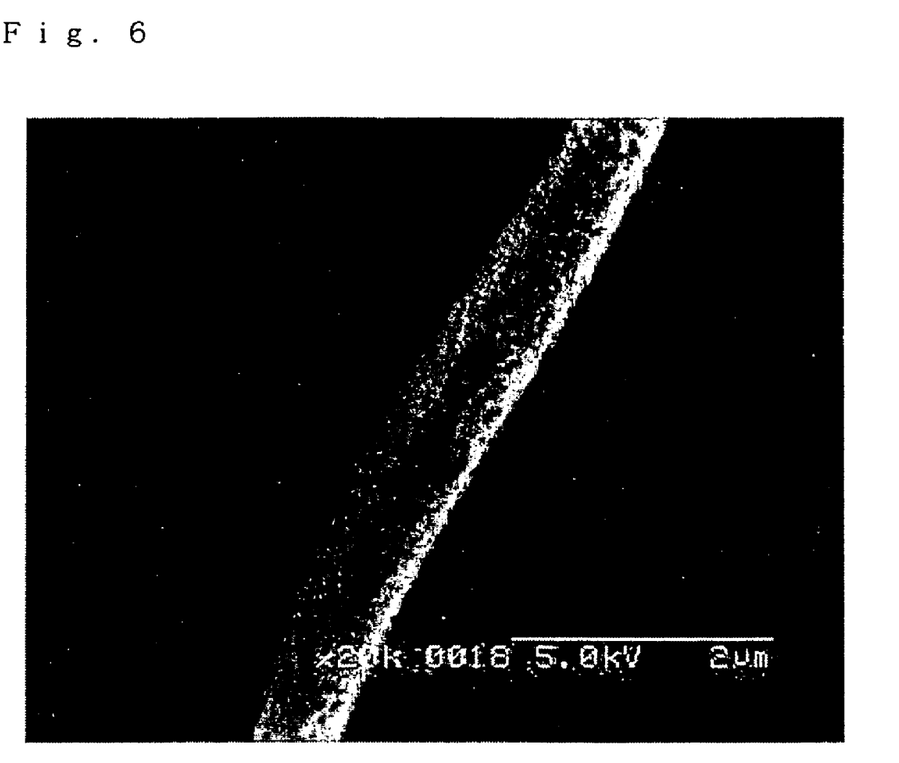
FIG. 6 is a photograph of the surface of the calcinated fiber structure obtained in Example 3, taken with a scanning electron microscope (20,000×).

The obtained fiber structure was flexible and had a mean fiber diameter of 0.8 μm, the mean diameter of depressions in the fiber surfaces was 80 nm, and the area of the depressions occupied 25% of the fiber surfaces. When the obtained fiber structure was measured by scanning electron microscope (S-2400 by Hitachi, Ltd.), no fibers with fiber lengths of less than 100 μm were observed. A scanning electron microscope photograph of the surface of the obtained fiber structure is shown in FIG. 6.

Example 4

A fiber structure was formed as a nonwoven fabric by the same procedure as in Example 1, except that 0.05 part by weight of polyethylene glycol was used, and the distance from the ejection nozzle 1 to the filamentous substance collecting electrode 5 was 20 cm.

When the obtained fiber structure was rendered infusible and fired by the same procedure as in Example 1, the obtained fiber structure was flexible and had a mean fiber-diameter of 0.7 μm.

Figure 7:
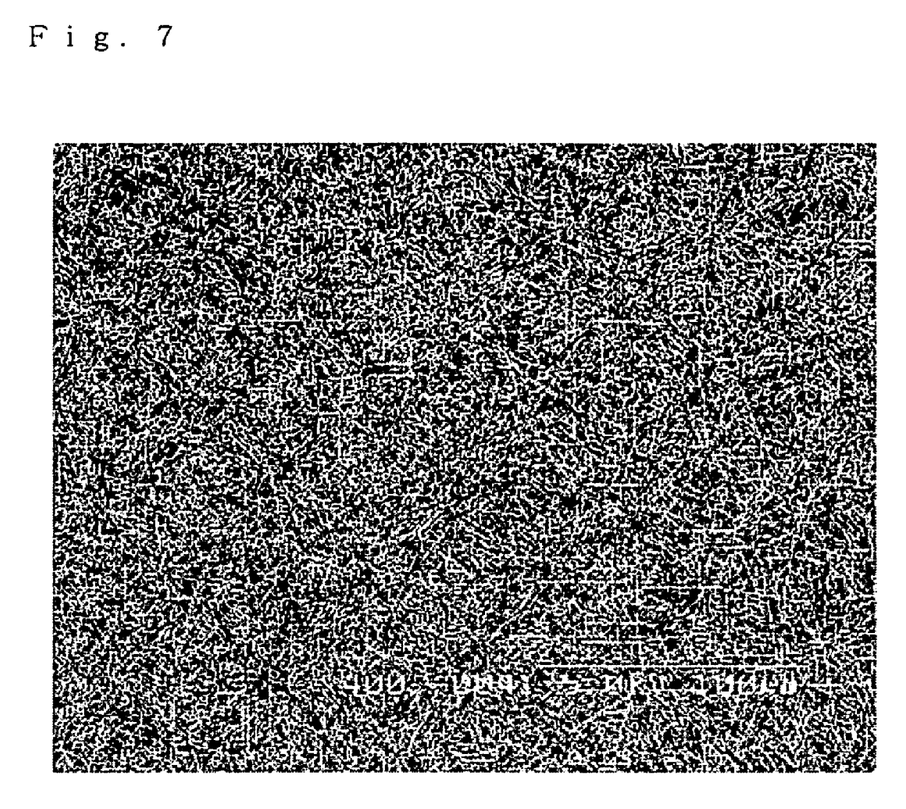
FIG. 7 is a photograph of the surface of the calcinated fiber structure obtained in Example 4, taken with a scanning electron microscope (400×).
Figure 8:
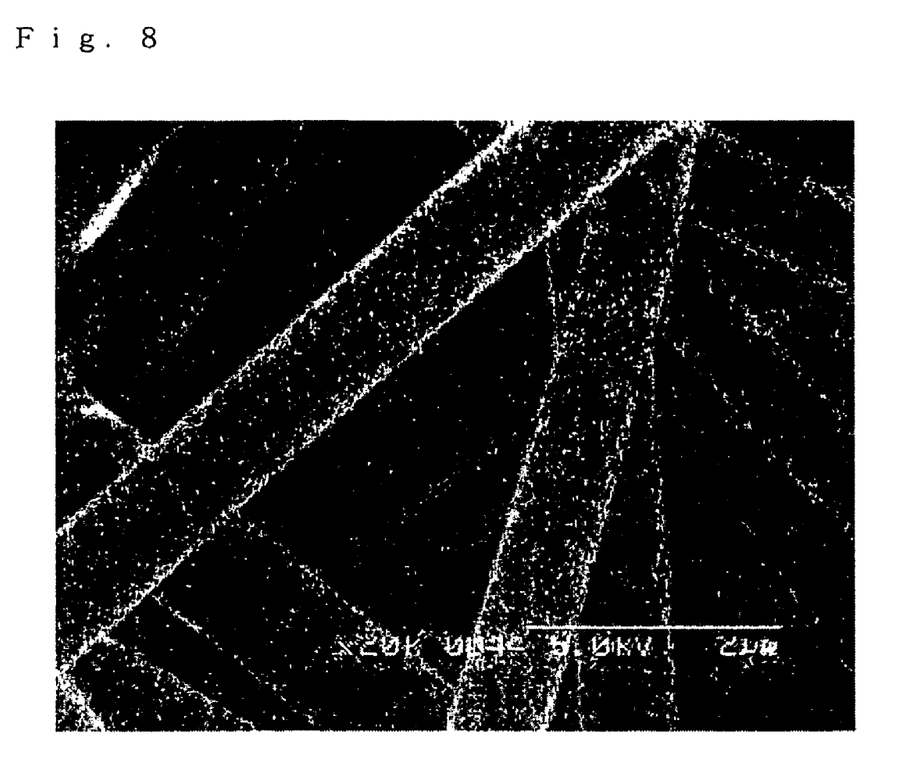
FIG. 8 is a photograph of the surface of the calcinated fiber structure obtained in Example 4, taken with a scanning electron microscope (20,000×).

The nonwoven fabric fiber structure was then shaped. When the obtained fiber structure was measured by scanning electron microscope (S-2400 by Hitachi, Ltd.), no fibers with fiber lengths of less than 100 μm were observed. Scanning electron microscope photographs of the surface of the obtained fiber structure are shown in FIGS. 7 and 8.

Example 5

A fiber structure was formed as a nonwoven fabric by the same procedure as in Example 4, except that the voltage was 30 kV, and the distance from the ejection nozzle 1 to the filamentous substance collecting electrode 5 was 10 cm. When the obtained fiber structure was rendered infusible and fired by the same procedure as in Example 1, the obtained fiber structure was flexible and had a mean fiber diameter of 0.5 μm.

Figure 9:
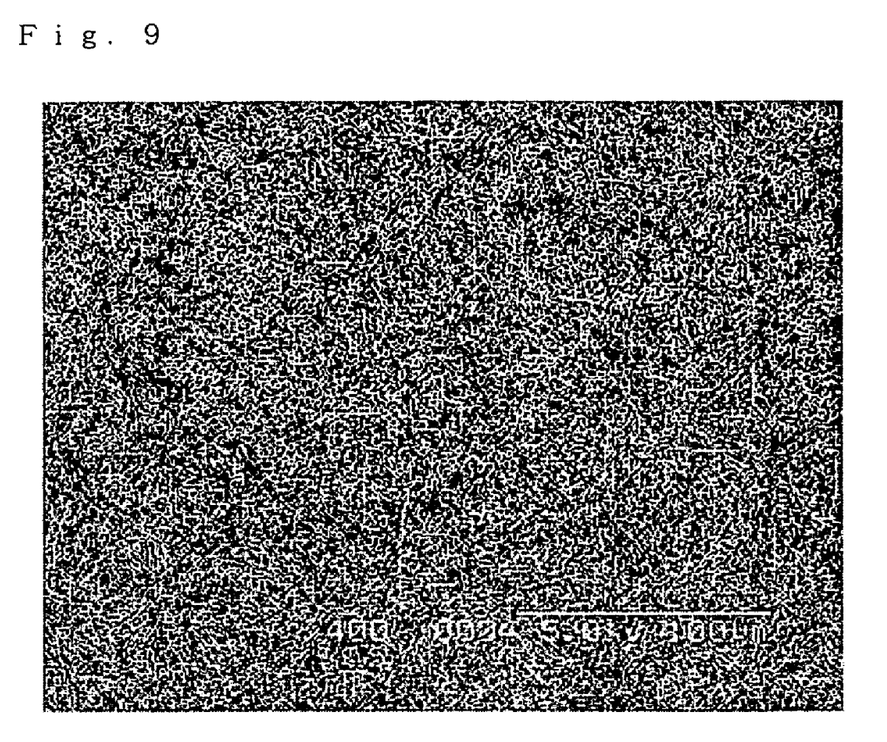
FIG. 9 is a photograph of the surface of the calcinated fiber structure obtained in Example 5, taken with a scanning electron microscope (400×).
Figure 10:
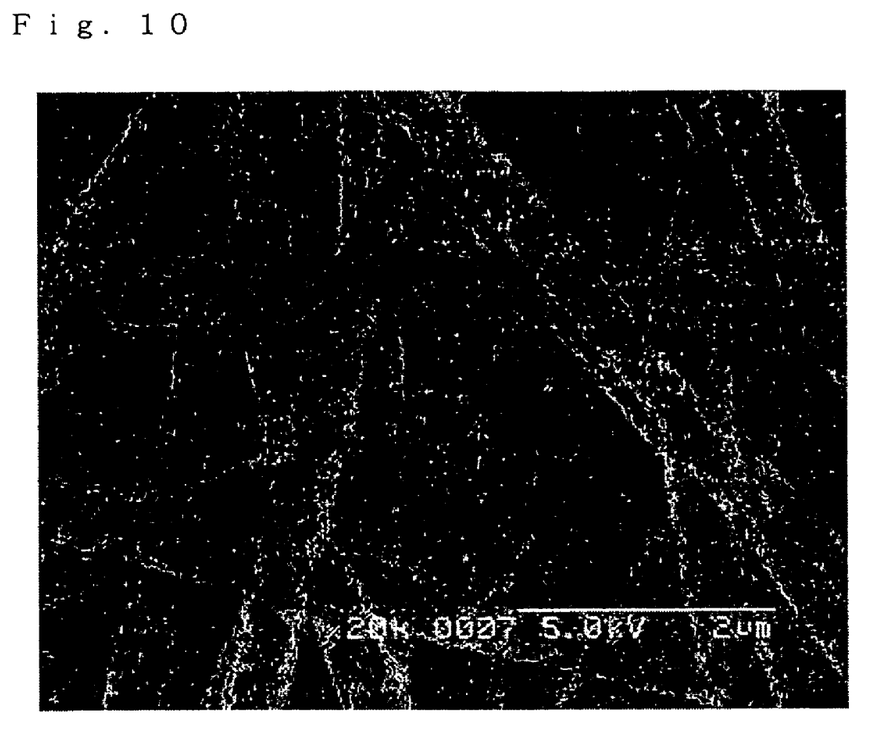
FIG. 10 is a photograph of the surface of the calcinated fiber structure obtained in Example 5, taken with a scanning electron microscope (20,000×).

The nonwoven fabric fiber structure was then shaped. When the obtained fiber structure was measured by scanning electron microscope (S-2400 by Hitachi, Ltd.), no fibers with fiber lengths of less than 100 μm were observed. Scanning electron microscope photographs of the surface of the obtained fiber structure are shown in FIGS. 9 and 10.

Comparative Example 1

The same procedure was carried out as in Example 1 except for using 1 part by weight of polycarbomethylsilane (molecular weight: 3500, Aldrich) and 9 parts by weight of dichloromethane (special grade, Wako Pure Chemical Industries, Ltd.) as the dope, but a granular solid was obtained instead of a fiber structure.

Comparative Example 2

The same procedure was carried out as in Comparative Example 1 except for using a solution comprising 1 part by weight of polycarbomethylsilane (molecular weight: 3500, Aldrich), 8 parts by weight of dichloromethane (special grade, Wako Pure Chemical Industries, Ltd.) and 1 part by weight of titanium tetrabutoxide (Wako Pure Chemical Industries, Ltd.) as the dope, and in this case as well, a granular solid was obtained instead of a fiber structure.

Comparative Example 3

Figure 11:
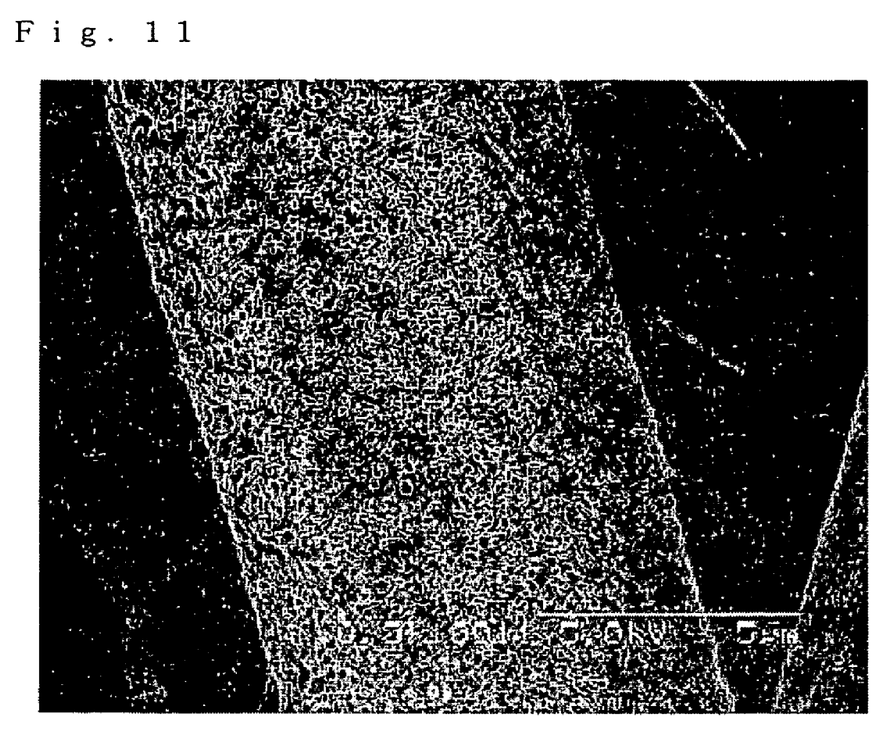
FIG. 11 is a photograph of the surface of the calcinated fiber structure obtained in Comparative Example 3, taken with a scanning electron microscope (20,000×).

The same procedure was carried out as in Comparative Example 1 except for using a solution comprising 9.9 parts by weight of polycarbomethylsilane (molecular weight: 3500, Aldrich), 90 parts by weight of dichloromethane (special grade, Wako Pure Chemical Industries, Ltd.) and 0.1 part by weight of polyethylene glycol (molecular weight: 4 million, Wako Pure Chemical Industries, Ltd.) as the dope, and in this case a filament nonwoven fabric was obtained. The nonwoven fabric was raised to a temperature of 200° C. (temperature-elevating rate: 10° C./min) and held for 1 hour in air, and then the temperature was raised to 1000° C. (temperature-elevating rate: 2° C./min) and maintained for 3 hours in a nitrogen atmosphere, after which the fabric was cooled to room temperature. The mean fiber diameter of the obtained fiber structure had a high thickness of 5 μm or greater. A scanning electron microscope photograph of the surface of the obtained fiber structure is shown in FIG. 11.

The invention claimed is:

1. Inorganic fibers consisting of silicon, carbon, oxygen and a transition metal, having a fiber diameter of no greater than 1.5 μm, and having fiber lengths of 100 μm or greater.

2. Inorganic fibers according to claim 1, wherein the surface structure of the fibers contains a plurality of depressions with diameters of 0.01-0.5 μm, and the depressions occupy 10-95% of the total surface area of the fibers.

3. Inorganic fibers according to claim 1, wherein the transition metal is titanium and/or zirconium.

4. Inorganic fibers according to claim 1, wherein the molar ratio of silicon and the transition metal is 100/1-1/10.

5. A fiber structure comprising at least fibers according to claim 1.

6. A fiber structure according to claim 5, of which 100% consists of inorganic fibers consisting of silicon, carbon, oxygen and a transition metal, having a fiber diameter of no greater than 1.5 μm, and having fiber lengths of 100 μm or greater.

7. A production process for a fiber structure, which comprises a step of dissolving three components, an organic silicon-based macromolecule, a fiber-forming organic macromolecule and a transition metal compound, to produce a solution, a step of spinning the solution by an electrospinning, a step of obtaining a precursor fiber structure accumulated on a collecting electrode plate by the spinning, a step of rendering the precursor fiber structure infusible to obtain an infusible fiber structure, and a step of calcinating the infusible fiber structure to obtain an inorganic fiber structure according to claim 5.

8. A production process according to claim 7, wherein the transition metal compound is a titanium compound and/or zirconium compound.

9. A production process according to claim 7, wherein the organic silicon-based macromolecule contains a repeating unit represented by the following general formula (1), (wherein R and R' are each independently selected from the group consisting of hydrogen, C1-10 lower alkyl groups and phenyl).

10. A production process according to claim 7, wherein the organic silicon-based macromolecule and transition metal mixing molar ratio is 100/1-1/10.

11. A production process according to claim 7, wherein the fiber-forming organic macromolecule is polyethylene glycol.

12. A production process according to claim 11, wherein the molecular weight of the polyethylene glycol is 50,000 or greater.

13. A production process according to claim 11, wherein the weight percentage of polyethylene glycol is 0.1-20% in the solution comprising the three components, an organic silicon-based macromolecule, a fiber-forming organic macromolecule and a transition metal compound.

14. A production process according to claim 7, which comprises a nonpolar solvent as the solvent.

15. A production process according to claim 14, which comprises a halogen-based solvent as the solvent.

16. A production process according to claim 15, wherein the solvent is dichloromethane.

* * * * *